US006811687B2

(12) United States Patent
Illingworth

(10) Patent No.: US 6,811,687 B2
(45) Date of Patent: Nov. 2, 2004

(54) VORTEX POOL CLEANER

(75) Inventor: Lewis Illingworth, Kensington, NH (US)

(73) Assignee: Vortex Holding Company, Avenel, NJ (US)

( * ) Notice: Subject to any disclaimer, the term of this patent is extended or adjusted under 35 U.S.C. 154(b) by 66 days.

(21) Appl. No.: 10/051,993

(22) Filed: Jan. 17, 2002

(65) Prior Publication Data

US 2003/0132152 A1 Jul. 17, 2003

Related U.S. Application Data

(63) Continuation-in-part of application No. 10/025,376, filed on Dec. 19, 2001, which is a continuation-in-part of application No. 09/835,084, filed on Apr. 13, 2001, which is a continuation-in-part of application No. 09/829,416, filed on Apr. 9, 2001, which is a continuation-in-part of application No. 09/728,602, filed on Dec. 1, 2000, which is a continuation-in-part of application No. 09/316,318, filed on May 21, 1999.

(51) Int. Cl.[7] .............................. F15C 1/16; B08B 5/04; B01D 45/12; E04H 4/16

(52) U.S. Cl. ....................... 210/169; 210/416.1; 15/1.7; 55/437; 55/447; 55/DIG. 3; 137/808

(58) Field of Search ................................ 210/169, 232, 210/416.1, 416.2, 512.1, 512.3; 15/1.7; 55/438, 447, 458, DIG. 3; 137/808, 809–811

(56) References Cited

U.S. PATENT DOCUMENTS 3,577,711 A * 5/1971 De Bernardo ............... 55/399
3,804,244 A * 4/1974 Skardal ..................... 209/725
3,895,926 A * 7/1975 Lerner ......................... 95/219
3,960,734 A * 6/1976 Zagorski .................. 210/512.2
3,961,393 A 6/1976 Pansini
4,052,950 A * 10/1977 Hirata ....................... 114/222
4,290,883 A * 9/1981 Sama ......................... 210/169
4,539,918 A * 9/1985 Beer et al. .................. 110/266
4,593,429 A 6/1986 Dyson
5,028,321 A * 7/1991 Stone et al. ................ 210/167
5,030,257 A 7/1991 Kasper et al.
5,163,786 A * 11/1992 Christianson ................ 406/41
5,656,050 A * 8/1997 Moredock .................... 55/394
5,766,315 A 6/1998 Moredock
6,168,641 B1 1/2001 Tuvin et al.
6,195,835 B1 3/2001 Song et al.

FOREIGN PATENT DOCUMENTS

SU 1664372 * 7/1991
WO WO 00/19881 4/2000

* cited by examiner

*Primary Examiner*—Fred G. Prince
(74) *Attorney, Agent, or Firm*—Ward & Olivo

(57) ABSTRACT

The present invention aims at improving pool cleaners. The improved pool cleaners utilize toroidal vortex technology to provide efficient fluid flow in a sealed system. The sealed system prevents dirt from escaping into surrounding fluid and retains kinetic energy of the flowing fluid. The present invention is also quieter, lighter, and simpler than conventional designs.

33 Claims, 15 Drawing Sheets

VORTEX POOL CLEANER

CROSS REFERENCE TO OTHER APPLICATIONS

This application is a continuation-in-part of application entitled "Toroidal Vortex Vacuum Cleaner Centrifugal Dust Separator," Ser. No. 10/025,376, filed Dec. 19, 2001 Pat. No. 6,719,830, which is a continuation-in-part of application entitled "Toroidal Vortex Bagless Vacuum Cleaner," Ser. No. 09/835,084, filed Apr. 13, 2001 Pat. No. 6,687,951, which is a continuation-in-part of application entitled "Toroidal and Compound Vortex Attractor," Ser. No. 09/829,416, filed Apr. 9, 2001 Pat. No. 6,729,839, which is a continuation-in-part of application Ser. No. 09/728,602, filed Dec. 1, 2000 Pat. No. 6,616,094, entitled "Lifting Platform," which is a continuation-in-part of Ser. No. 09/316,318, filed May 21, 1999 Pat. No. 6,595,753, entitled "Vortex Attractor."

TECHNICAL FIELD OF THE INVENTION

The present invention relates initially, and thus generally, to an improved pool cleaner. More specifically, the present invention relates to a pool cleaner that utilizes a toroidal vortex such that the fluid flow within the pool cleaner housing is contained therein. The present invention prevents dirty water within the device from escaping back into the pool. The features of the present invention allow for a simpler, lighter, and more efficient pool cleaner.

BACKGROUND OF THE INVENTION

The use of vortex forces is known in various arts, including the separation of matter from liquid and gas effluent flow streams, the removal of contaminated air from a region and the propulsion of objects. However, toroidal vortex flow has not previously been provided in a bagless vacuum device having light weight and high efficiency.

The prior art is strikingly devoid of references dealing with toroidal vortices in a vacuum cleaner application. However, an Australian reference has some similarities. This Australian reference does not approach the scope of the present invention, it is worth disusing its key features of operation so that one skilled in the art can readily see how its shortcomings are overcome by that which is disclosed herein.

In discussing Day International Publication number WO 00/19881 (the "Day publication"), an explanation of the Coanda effect is required. This is the ability for a jet of air to follow around a curved surface. It is usually referred to without explanation, but is generally understood provided that one makes use of "momentum" theory: a system based on Newton's laws of motion. Utilizing the "momentum" theory instead of Bernoulli's principles provides a simpler understanding of the Coanda effect.

FIG. 1 shows the establishment of the Coanda effect. In (A) air is blown out horizontally from a nozzle 100 with constant speed V. The nozzle 100 is placed adjacent to a curved surface 102. Where the air jet 101 touches the curved surface 102 at point 103, the air between the jet 101 and the surface 102 as it curves away is pulled into the moving airstream both by air friction and the reduced air pressure in the jet stream, which can be derived using Bernoulli's principles. As the air is carried away, the pressure at point 103 drops. There is now a pressure differential across the jet stream so the stream is forced to bend down, as in (B). The contact point 104 has moved to the right. As air is continuously being pulled away at point 104, the jet continues to be pulled down to the curved surface 102. The process continues as in (C) until the air jet velocity V is reduced by air and surface friction.

FIG. 2 shows the steady state Coanda effect dynamics. Air is ejected horizontally from a nozzle 200 with speed represented by vector 201 tangentially to a curved surface 203. The air follows the surface 203 with a mean radius 204. Air, having mass, tries to move in a straight line in conformance with the law of conservation of momentum. However, it is deflected around by a pressure difference across the flow 202. The pressure on the outside is atmospheric, and that on the inside of the airstream at the curved surface is atmospheric minus $\varrho V^2/R$ where $\varrho$ is the density of the air.

The vacuum cleaner Coanda application of the Day publication has an annular jet 300 with a spherical surface 301, as shown in FIG. 3. The air may be ejected sideways radially, or may have a spin to it as shown with both radial and tangential components of velocity. Such an arrangement has many applications and is the basis for various "flying saucer" designs.

The simplest coanda nozzle 402 described in the Day publication is shown in FIG. 4. Generally, the nozzle 402 comprises a forward housing 407, rear housing 408 and central divider 403. Air is delivered by a fan to an air delivery duct 400 and led through the input nozzle 401 to an output nozzle 402. At this point the airflow cross section is reduced so that air flowing through the nozzle 402 does so at high speed. The air may also have a rotational component, as there is no provision for straightening the airflow after it leaves the air pumping fan. The central divider 403 swells out in the terminating region of the output nozzle 402 and has a smoothly curved surface 404 for the air to flow around into the air return duct using the Coanda effect.

Air in the space below the Coanda surface moves at high speed and is at a lower than ambient pressure. Thus dust in the region is swept up 405 into the airflow 409 and carried into the air return duct 406. For dust to be carried up this duct, the pressure must be low and a steady flow rate must be maintained. After passing through a dust collection system the air is sent through a fan back to the air delivery duct. Constriction of the airflow by the output nozzle leads to a pressure above ambient in this duct ahead of the jet. In sum, air pressure within the system is above ambient in the air delivery duct and below ambient in the air return duct.

Coanda attraction to a curved surface is not perfect. As shown in FIG. 5, not all the air issuing from the output nozzle is turned around to enter the air return duct. An outer layer of air proceeds in a straight fashion 501. When the nozzle is close to the floor, this stray air will be deflected to move horizontally parallel to the floor and should be picked up by the air return duct if the pressure there is sufficiently low. In this case, the system may be considered sealed; no air enters or leaves, and all the air leaving the output nozzle is returned.

When the nozzle is high above the ground, however, there is nothing to turn stray air 501 around into the air return duct and it proceeds out of the nozzle area. Outside air 502, with a low energy level is sucked into the air return to make up the loss. The system is no longer sealed. An example of what happens then is that dust underneath and ahead of the nozzle is blown away. In a bagless system such as this, where fine dust is not completely spun out of the airflow but recirculates around the coanda nozzle, some of this dust will be returned to the surrounding air.

Air leakage is exacerbated by rotation in the air delivery duct caused by the pumping fan. Air leaving the output nozzle rotates so that centrifugal force spreads out the airflow into a cone. The effect is to generate a higher quantity of stray air. Air rotation can be eliminated by adding flow straightening vanes to the air delivery duct, but these are neither mentioned nor illustrated in the Day publication.

A side and bottom view of an annular Coanda nozzle 600 is shown in FIG. 6. This is a symmetrical version of the nozzle shown in FIG. 4. Generally, the nozzle 600 comprises outer housing 602, air delivery duct 601, air return duct 605, flow spreader 603 and annular Coanda nozzle 604. Air passes down though the central air delivery duct 601, and is guided out sideways by a flow spreader 603 to flow over an annular curved surface 604 by the Coanda effect, and is collected through the air return duct 605 by a tubular outer housing 602.

This arrangement suffers from the previously described shortcomings in that air strays away from the Coanda flow, particularly when the jet is spaced away from a surface.

While it is conceivable that the performance of the invention of the Day publication would be improved by blowing air in the reverse direction, down the outer air return duct and back up through the central air delivery duct, stray air would then accumulate in the central area rather than be ejected out radially. Unfortunately, the spinning air from the air pump fan would cause the air from the nozzle to be thrown out radially due to centrifugal force (centripetal acceleration) and the system would not work. This effect could be overcome by the addition of flow straightening vanes following the fan. However, none are shown, and one may conclude that the effects of spiraling airflow were not understood by the designer.

The Day publication has more complex systems with jets to accelerate airflow to pull it around the Coanda surface, and additional jets to blow air down to stir up dust and others to optimize airflow within the system. However, these additions are not pertinent to the analysis herein.

The problems with the invention of the Day publication are remedied by the Applicant's toroidal vortex vacuum cleaner. The toroidal vortex vacuum cleaner is a bagless design and one in which airflow must be contained within itself at all times. The contained airflow continually circulates from the vacuum cleaner nozzle, to a centrifugal separator, and back to the nozzle. Since dust is not always fully separated, some dust will remain in the airstream heading back towards the nozzle. The air already withing the system, however, does not leave the system preventing dust from escaping back into the atmosphere. It is not sufficient to design the cleaner to ensure essentially sealed operation while operating adjacent to a surface being cleaned, operation must also remain sealed when away from a surface to prevent fine dust particles from re-entering the surrounding air.

Another reason for maintaining sealed operation when the apparatus is away from the surface is to prevent the vacuum cleaner nozzle from blowing surface dust around.

The Day publication, in most of its configurations, is coaxial in that air is blown out from a central duct and is returned into a coaxial return duct. The toroidal vortex attractor is coaxial, but operates the in the opposite direction. With the toroidal vortex attractor, air is blown out of an annular duct and returned into a central duct.

The inventor has also noted the presence of "cyclone" bagless vacuum cleaners in the prior art. The present invention utilizes an entirely different type of flow geometry allowing for much greater efficiency and lighter weight. Nonetheless, the following represent references that the inventor believes to be representative of the art in the field of bagless cyclone vacuum cleaners. One skilled in the art will plainly see that these do not approach the scope of the present invention, but they have been included for the sake of completeness.

Also relevant to the present invention are Dyson U.S. Pat. No. 4,593,429, Kasper et al. U.S. Pat. No. 5,030,257, Moredock U.S. Pat. No. 5,766,315, Tuvin et al. U.S. Pat. No. 6,168,641, and Song, et al. U.S. Pat. No. 6,195,835. However none of these references claim an invention as simple or efficient as the present invention.

Dyson U.S. Pat. No. 4,593,429 discloses a vacuum cleaning appliance utilizing series connected cyclones. The appliance utilizes a high-efficiency cyclone in series with a low-efficiency cyclone. This is done in order to effectively collect both large and small particles. In conventional cyclone vacuum cleaners, large particles are carried by a high-efficiency cyclone, thereby reducing efficiency and increasing noise. Therefore, Dyson teaches incorporating a low-efficiency cyclone to handle the large particles. Small particles continue to be handled by the high-efficiency cyclone. While Dyson does utilize a bagless configuration, the type of flow geometry is entirely different. Furthermore, the energy required to sustain this flow is much greater than that of the present invention.

Song, et al U.S. Pat. No. 6,195,835 is directed to a vacuum cleaner having a cyclone dust collecting device for separating and collecting dust and dirt of a comparatively large particle size. The dust and dirt is sucked into the cleaner by centrifugal force. The cyclone dust collecting device is biaxially placed against the extension pipe of the cleaner and includes a cyclone body having two tubes connected to the extension pipe and a dirt collecting tub connected to the cyclone body.

Specifically, the dirt collecting tub is removable. The cyclone body has an air inlet and an air outlet. The dirt-containing air sucked via the suction opening enters via the air inlet in a slanting direction against the cyclone body, thereby producing a whirlpool air current inside of the cyclone body. The dirt contained in the air is separated from the air by centrifugal force and is collected at the dirt collecting tub. A dirt separating grill having a plurality of holes is formed at the air outlet of the cyclone body to prevent the dust from flowing backward via the air outlet together with the air. Thus, the dirt sucked in by the device is primarily collected by the cyclone dust connecting device, thus extending the period of time before replacing the paper filter.

The device of Song et al. differs primarily from the present invention in that it requires a filter. The present invention utilizes such an efficient flow geometry that the need for a filter is eliminated. Furthermore, the conventional cyclone flow of Song et al is traditionally less energy efficient and noisier than the present invention.

Kasper et al. makes use of a vortex contained in a vertically aligned cylinder comprising multiple slots running the length of the side of the cylinder. A vortex fluid flow is generated within the cylinder, thereby ejecting air, dirt, and other unwanted debris outward through the slots. The ejected air and debris then come into contact with the surface of a liquid. The liquid then captures the debris and the cleaned air is free to return to the inside of the cylinder. Cleaned air is further sent upwardly out of the cylinder.

The first major problem with Kasper et al. evolves from the use of a water bath. A liquid bath adds both weight and complexity. Additional maintenance is also required to change the liquid, prevent corrosion, etc. In contrast, the present invention does not to utilize liquid to separate debris from air. In fact, the present invention can separate matter from liquids as well. Kasper et al.'s device could not achieve such results given that the liquid-air surface is integral for collecting particles. More specific to the cyclone separator, the cyclone is maintained solely by the wall of the cylinder. The present invention uses a solid surface to maintain cylindrical flow in conjunction with high pressure from the dust collector. No such pressure is provided in Kasper et al.'s patent; air is free to be ejected out the slots and return into the cylinder from beneath. Additionally, Kasper et al. mix circulating air ejected from the cyclone with non-circulating incoming air, thereby inducing energy losses. The present invention avoids this problem by ensuring that all incoming air is traveling in a circular path. Hence, the present invention is simpler, lighter, more efficient, and less noisy.

Tuvin et al. also make use of a cyclone separation system. The Tuvin et al. patent includes a cyclone separator that ejects particles outward from a cyclone. However, there are several major differences between from the present invention and Tuvin et al. First, the means for creating the cyclone flow is not the same. The present invention utilizes an impeller, centrifugal pump, or propeller to create the cylindrical airflow necessary to achieve separation. In contrast, Tuvin et al.'s patent directs the air entering the cyclone chamber tangentially with the chamber's wall. Therefore, in Tuvin et al., the chamber's wall is what then forces the air into cylindrical flow.

In terms of efficiency, the present invention utilizes an impeller, propeller, or centrifugal pump to create the cylindrical flow and the necessary suction in a single step. This is advantageous from energy saving and simplicity standpoints since two separate steps are not necessary. In contrast, Tuvin et al. makes use of a filter as the final step before air exits the device. This is disadvantageous because filters impede airflow, consuming energy and compromising efficiency. Filters are not needed in the present invention because separation is sufficiently performed. Moreover, the present invention can remove both large and small particles in one step. Tuvin, et al.'s invention necessitates two steps, involving a coarse separator and a cyclone chamber. Therefore, the cyclone chamber must only be capable of separating fine particles. Efficiency is further reduced by these extra steps while complexity is added. Consequently, the present invention in simpler and more efficient then that disclosed in Tuvin et al.

Finally, Moredock U.S. Pat. No. 5,766,315 discloses a centrifugal separator that ejects particles radially. Nevertheless, the apparatus is not as simple and efficient as the present invention. In Moredock the cylindrical flow is created by allowing air to enter the dome tangentially with respect to the wall. The same disadvantages concerning efficiency and simplicity apply. Also, the ejection duct used by Moredock differs significantly from the present invention's dust collector. Moredock ejects particles from the dome via a slot running vertically along the wall. The slot leads into a duct traveling away from the apparatus. The duct allows air to exit along with the particles. No indication of back-pressure is disclosed as in the present invention. Consequently, air pressure can not be used to maintain cylindrical flow. Without pressure assisting stabilization, airflow is further disrupted reducing the acceptable width of the slot. Furthermore, Moredock allows air to exit the system. This air is still dust-laden and needs further cleaning. Also in Moredock, kinetic energy from the exiting air is lost from the system. However, the present invention keeps the dust-laden air within the chamber and dust collector. No dust-laden air is allowed to exit. Therefore, the present invention is not only simpler, more efficient, but also more effective than that disclosed in Moredock.

Furthermore, no similar technology has been used for cleaning pools. Pansini, U.S. Pat. No. 3,961,393, discloses a pool cleaner that utilizes vortex flow. Yet, Pansini does not anticipate the benefits of the present invention. Pansini uses jets directed at specific angles to create an upward spiraling vortex. This vortex creates suction carrying debris into a bag or filter. The flowing fluid is then allowed to pass back into the pool. As discussed previously, filters and uncontained fluid flow are both inefficient.

Thus, there is a clear and long felt need in the art for a light weight, efficient and quiet bagless vacuum cleaner which prevents dust laden air from flowing into the atmosphere.

SUMMARY OF THE INVENTION

The present invention relies upon technology from the applicant's prior invention disclosed in co-pending application "Toroidal Vortex Bagless Vacuum Cleaner," Ser. No. 09/835,084, filed Apr. 13, 2001,which is herein incorporated by reference. The bagless vacuum cleaner of this invention was developed from technology disclosed in the co-pending application "Toroidal and Compound Vortex Attractor," Ser. No. 09/829,416, filed Apr. 9, 2001, which is incorporated herein by reference. These attractors stem from technology disclosed in the co-pending application "Lifting Platform," Ser. No. 09/728,602, filed on Dec. 1, 2000, which is incorporated herein by reference. Finally, the lifting platform technology is based upon technology disclosed in co-pending application "Vortex Attractor," Ser. No. 09/316,318, filed May 21, 1999, which is incorporated herein by reference.

Described herein are embodiments that deal with both toroidal vortex pool cleaner nozzles and systems. The nozzles include simple concentric systems and more advanced, optimized systems. Such optimized systems utilize a thickened inner tube that is rounded off at the bottom for smooth water flow from the water delivery duct to the air return duct. It is also contemplated that the nozzle include flow straightening vanes to eliminate rotational components in the water flow that greatly harm efficiency. The cross section of the nozzle need not be circular, in fact, a rectangular embodiment is disclosed herein, and other embodiments are possible.

The toroidal vortex nozzle is composed of concentric inner and outer tubes. Dust-laden airflow is contained in the inner tube, and cleaned airflow is contained between the outer and inner tubes. Also, straightening vanes are disposed between the inner and outer tubes. These straightening vanes provide non-rotating airflow back to the nozzle. If air is rotating, a significant amount can be expelled from the annulus into the atmosphere, thus compromising the efficiency of the nozzle.

A complete vacuum system utilizing toroidal vortex technology takes in dust-laden air in the inner tube, and returns dust-free air back through the annulus between the inner and outer tubes. Dust-laden air is taken in through an inner tubing leading into the impeller blades. The blades accelerate incoming air into a circular pattern inducing the cylindrical vortex flow in a separation chamber. Alternatively, an axial pump or propeller can be mounted in the inner tube. The inner tube may be swelled out for this purpose. Inside the separation chamber, dirt and debris are centrifugally separated. The cleaned air is then driven into an annulus formed by the gap between the outer tube and the inner tube. Straightening vanes in the annulus manipulate airflow to eliminate rotational components. Straightened airflow is essential for a toroidal vortex nozzle to perform optimally. If air is rotating, a significant amount can be expelled from the annulus into the atmosphere, thus compromising the efficiency of the nozzle. However, the centrifugal separator is capable of cleaning air without a nozzle. The cylindrical vortex in the centrifugal separator is an inherent part of the dust separation process and is in itself independent of the toroidal vortex nozzle application.

More specific to the separation chamber, a cylindrical vortex is formed such that a circular pattern of flow exiting from the impeller spirals downward along the chamber's outer wall, and then upward along the chamber's inner wall. At the top of the chamber's inner wall is the opening leading air out of the chamber and into the annular duct between the outer and inner tubes. The circular flow of the air acts as a centrifuge, forcing the higher mass dust particles outward. The spiraling air also creates a pressure in the dust collector that is above that in the body of the separation chamber due to kinetic energy of the circulating air. This higher pressure pushes the spiraling air inward, maintaining the air's circular path. However, the dust particles are not inhibited from traveling straight into the collector.

Unlike other vacuum cleaners that employ centrifugal dust separation (e.g., the "cyclone" types discussed previously), the present invention spins the fluid around at the blade speed of the impeller. Thus, the system acts like a high speed centrifuge capable of removing very small particles from the fluid flow. No vacuum bag, liquid bath, or filter is required.

One of the main features of the improved vacuum cleaner is the inherent low power consumption. The losses that must exist when bags or filters are utilized are eliminated here. Bags and filters resist fluid flow, thus requiring greater power to maintain a proper flowrate. Additional efficiency arises from the closed fluid system. Energy supplied by the impeller is not lost because fluid is not expelled into the atmosphere, but is instead retained in the system. Finally, since only smooth changes in the direction of fluid flow are made, the effect on the energy of the moving fluid is minimal. Hence, the disclosed system contains efficiency improvements not considered by the prior art. Furthermore, the design is expected to be virtually maintenance free.

The efficient features of previous embodiments can be easily adapted to function in other fluids. The present invention, an improved pool cleaner using vortex technology, functions much in the same way as the vortex vacuum cleaners. A brush may be added to the nozzle in order to loosen debris on the pool's surface. Wheels may also be provided to allow the vortex pool cleaner to traverse the pool's surface.

Thus, it is an object of the present invention to utilize toroidal vortices in a pool cleaner application.

Additionally, it is an object of the present invention to provide an efficient pool cleaner.

Also, it is an object of the present invention to utilize vortex technology in upright and cannister pool cleaners.

Furthermore, it is an object of the present invention to provide a quiet pool cleaner.

It is a further object of the present invention to provide a light weight pool cleaner.

In addition, it is an object of the present invention to provide a low-maintenance pool cleaner.

It is yet another object of the present invention to provide a bagless pool cleaner.

It is a further object of the present invention to provide a pool cleaner that does not require the use of filters.

SUMMARY OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Certain terminology will be used in the following description for convenience in reference only and will not be limiting. The words "in" and "out" will refer to directions toward and away from, respectively, the geometric center of the device and designated and/or reference parts thereof. The words "up" and "down" will indicate directions relative to the horizontal and as depicted in the various figures. The words "clockwise" and "counterclockwise" will indicate rotation relative to a standard "right-handed" coordinate system. Such terminology will include the words above specifically mentioned, derivatives thereof and words of similar import.

Figure 1A:
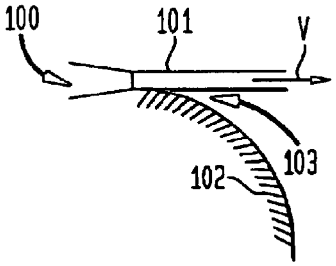
FIG. 1A (PRIOR ART)
FIG. 1, already discussed, depicts the establishment of the coanda effect (PRIOR ART)
Figure 1B:
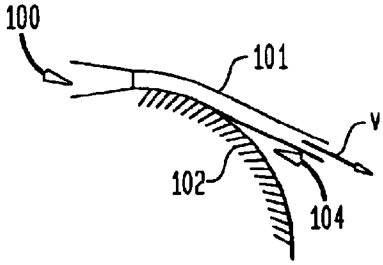
FIG. 1B (PRIOR ART)
Figure 1C:
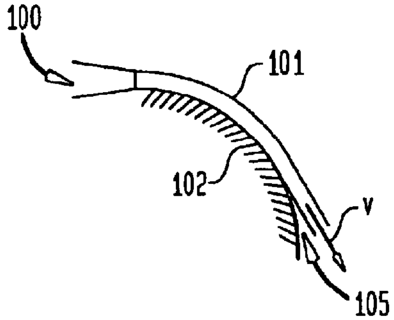
FIG. 1C (PRIOR ART)
Figure 2:
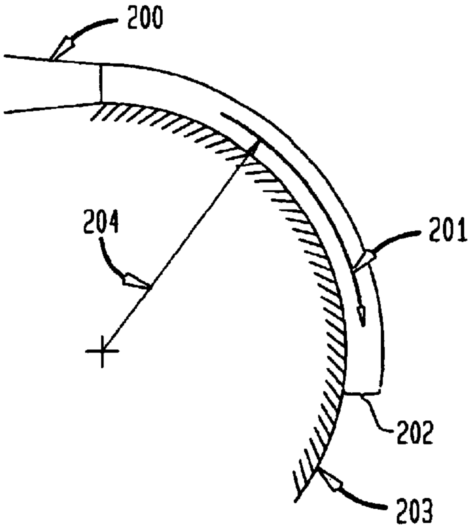
FIG. 2 (PRIOR ART)
FIG. 2, already discussed, depicts the dynamics of the coanda effect (PRIOR ART)
Figure 3:
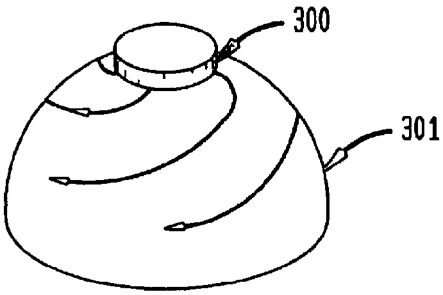
FIG. 3 (PRIOR ART)
FIG. 3, already discussed, depicts the coanda effect on a spherical surface with both radial and tangential components of motion (PRIOR ART)
Figure 4:
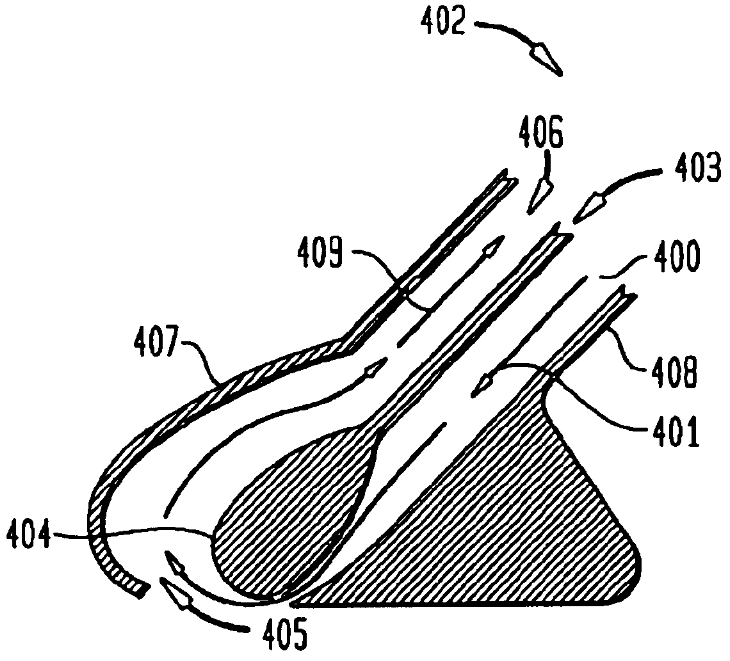
FIG. 4 (PRIOR ART)
FIG. 4, already discussed, depicts a coanda vacuum cleaner nozzle (PRIOR ART)
Figure 5:
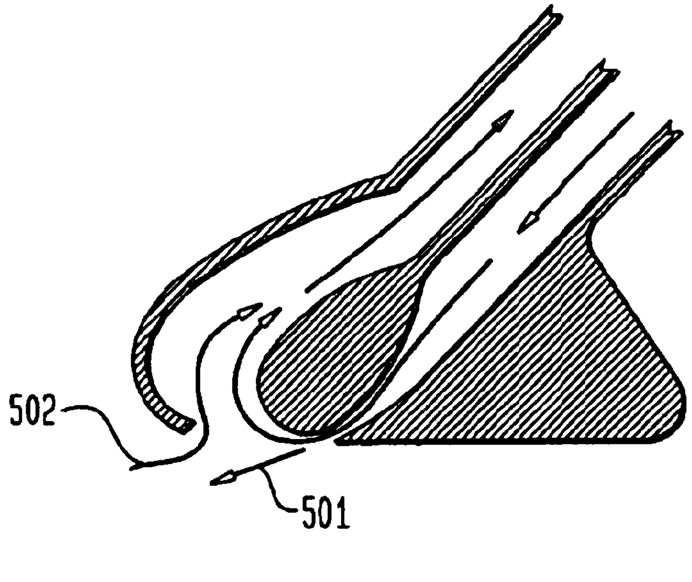
FIG. 5 (PRIOR ART)
FIG. 5, already discussed, depicts the undesirable airflow in a coanda vacuum cleaner nozzle (PRIOR ART)
Figure 6:
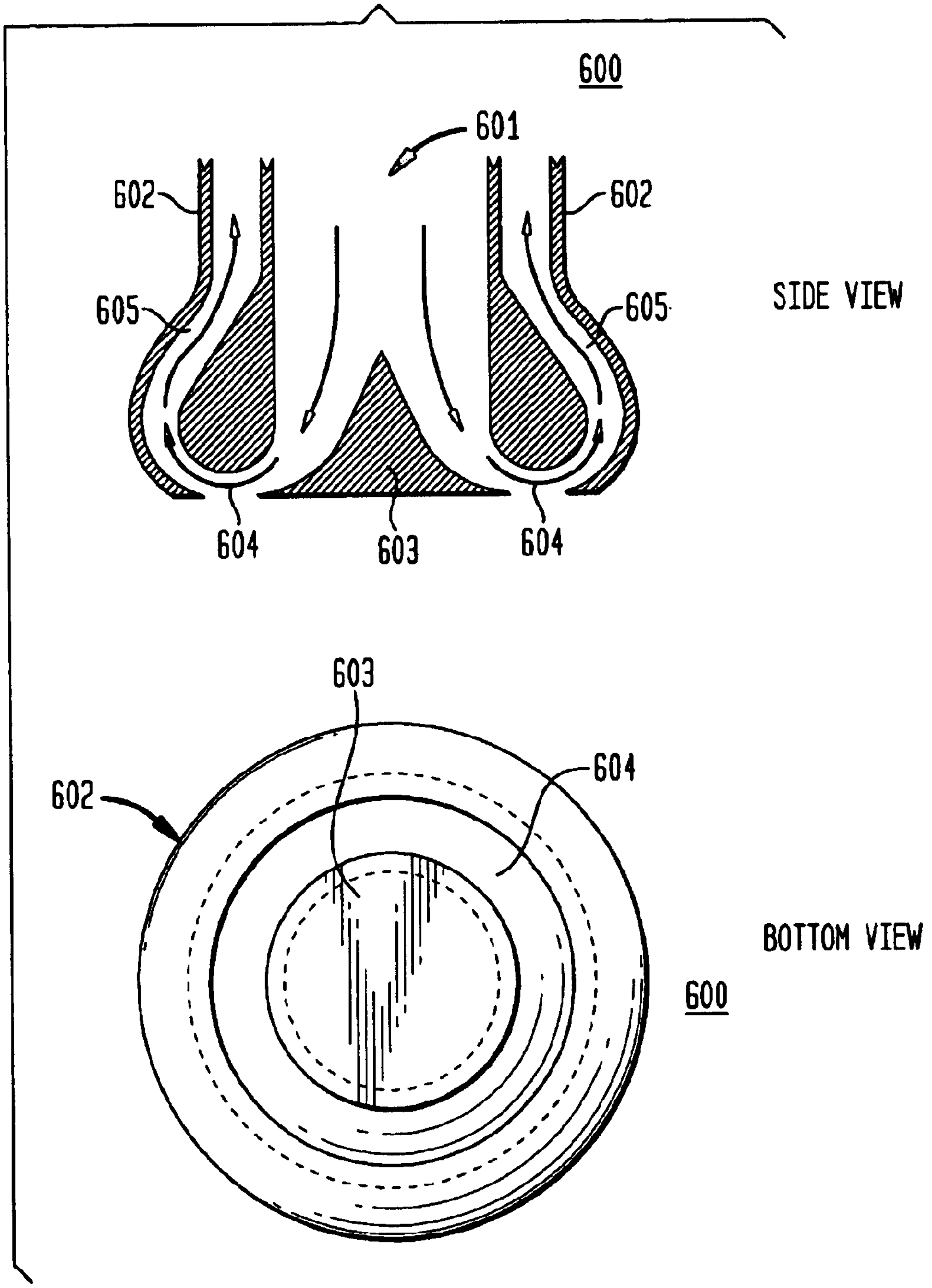
FIG. 6 (PRIOR ART)
FIG. 6, already discussed, depicts a side and bottom view of an annular coanda vacuum cleaner nozzle (PRIOR ART)
Figure 7:
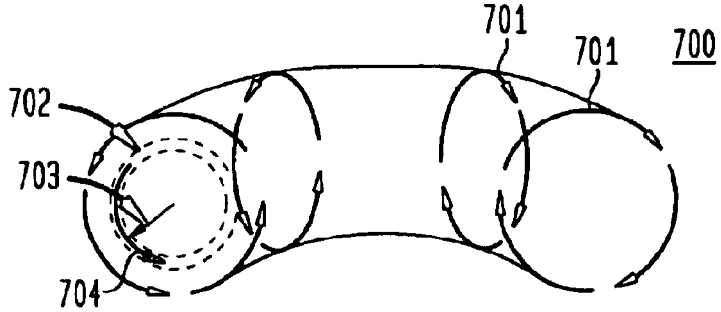
FIG. 7 depicts a toroidal vortex, shown sliced in half.

A toroidal vortex is a donut of rotating air. The most common example is a smoke ring. It is basically a self-sustaining natural phenomenon. FIG. 7 shows a toroidal vortex 700, at an angle, and sliced in two to illustrate the airflow 701. In a section of the vortex, a particular air motion section is shown by a stream tube 702, in which the air constantly circles around. Here it is shown with a mean radius 703 and mean speed 704. Circular motion is maintained by a pressure differential across the stream tube, the pressure being higher on the outside than the inside. This pressure difference Δp is, by momentum theory, $\Delta p = \varrho V^2/R$ where ϱ is the air density, R is radius 703 and V is velocity 704. Thus the pressure decreases from the outside of the toroid to the center of the cross section, and then increases again towards the center of the toroid. The example shows air moving downwards on the outside of the toroid 700, but the airflow direction can be reversed for the function and pressure profile to remain the same. The downward outside motion is chosen because it is the preferred direction used in the toroidal vortex vacuum cleaner of the present invention.

Figure 8:
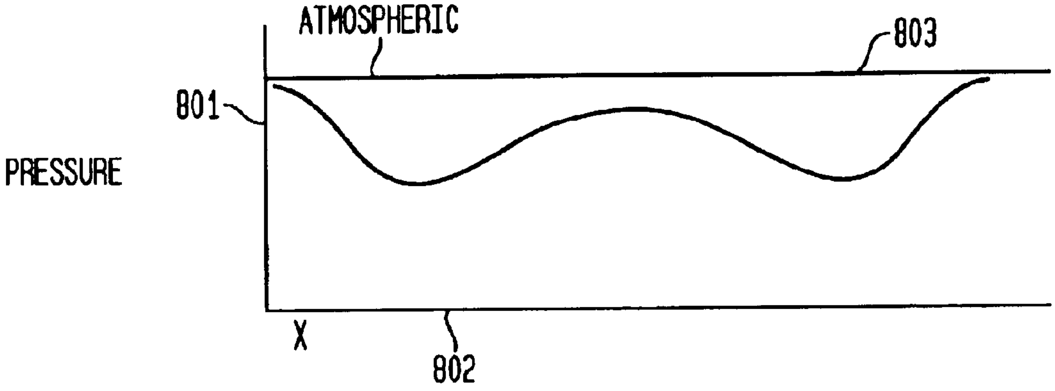
FIG. 8 graphically depicts the pressure distribution across the toroidal vortex of FIG. 7.

FIG. 8 shows a typical pressure profile across the toroidal vortex. Shown is the pressure on axis 801 as a function of distance in the x direction 802. Line 803 is a reference for atmospheric pressure, which remains constant along the x direction. The present invention was developed from a toroidal vortex attractor previously described by the inventor.

Figure 9:
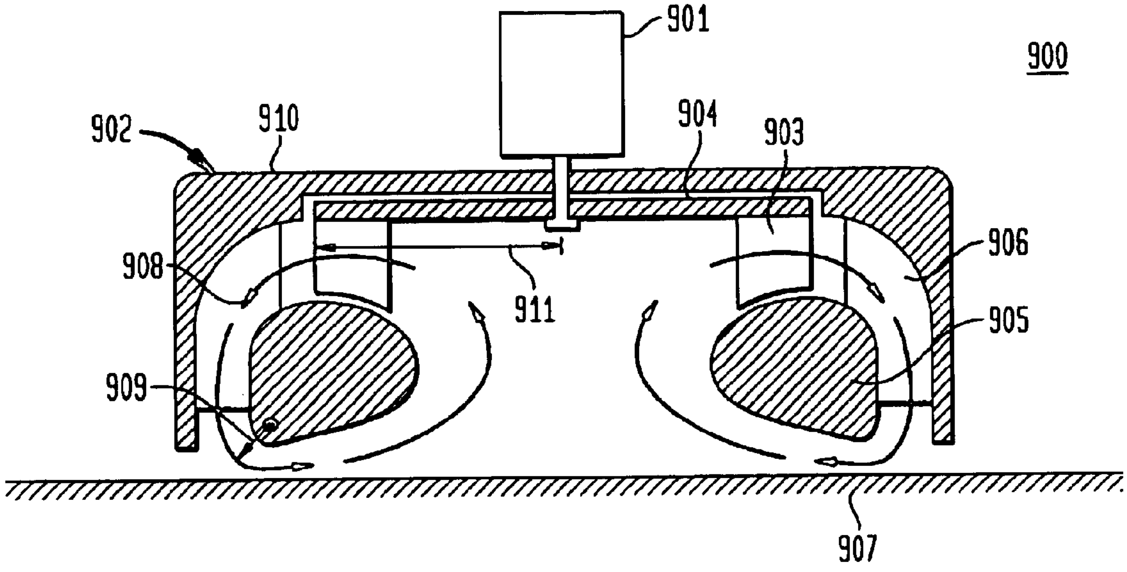
FIG. 9 depicts a toroidal vortex attractor.

FIG. 9 shows a toroidal vortex attractor that has a motor 901 driving a centrifugal pump located within an outer housing 902. The centrifugal pump comprises blades 903 and backplate 904. This pumps air around an inner shroud 905 so that the airflow is a toroidal vortex with a solid donut core. Flow straightening vanes 906 are inserted after the centrifugal pump and between the inner shroud 905 and the outer casing 902 in order to remove the tangential component of air motion from the airflow. The air moves tangentially around the inner shroud 905 cross section, but radially with respect to the centrifugal pump.

Air pressure within the housing 902 is below ambient. The pressure difference between ambient and inner air is maintained by the curved airflow around the inner shroud's 905 lower outer edge. The outer air turns the downward flow between the inner shroud 905 and outer casing 902 into a horizontal flow between the inner shroud and the attracted surface 907. This pressure difference is determined by $\varrho v^2/r$ where v is the speed of the air circulating 908 around the inner shroud 905, r is the radius of curvature 909 of the airflow and ϱ is the air density. The maximum air pressure differential is determined by the centrifugal pump blade tip speed (V) at point 910, and tip radius (R) 911 ($\varrho V^2/R$).

The toroidal vortex attractor 900 can be thought of as a vacuum cleaner without a dust collection system. Dust particles picked up from the attracted surface 907 are picked up by the high speed low pressure airflow and circulate around.

The toroidal vortex vacuum cleaner is a bagless design and one in which airflow must be contained within itself at all times. Air continually circulates from the area being cleaned, through the dust collector and back again. The contained airflow continually circulates from the vacuum cleaner nozzle, to a centrifugal separator, and back to the nozzle. Since dust is not always fully separated, some dust will remain in the airstream heading back towards the nozzle. The air already withing the system, however, does not leave the system preventing dust from escaping back into the atmosphere. It is not sufficient to design the cleaner to ensure essentially sealed operation while operating adjacent to a surface being cleaned, operation must also remain sealed when away from a surface to prevent fine dust particles from re-entering the surrounding air.

Sealed operation away from a surface is also important because it prevents the vacuum cleaner nozzle from blowing surface is dust around.

Figure 10:
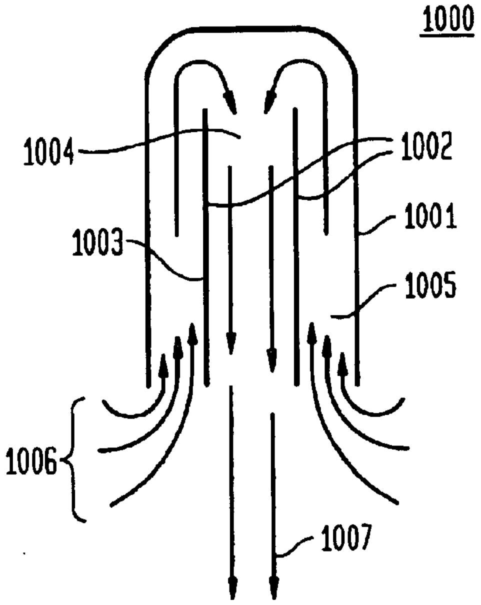
FIG. 10 (PRIOR ART)
FIG. 10 depicts a cross section of a concentric vacuum system (PRIOR ART)

The toroidal vortex attractor is coaxial and operates in a way that air is blown out of an annular duct and returned into a central duct. FIG. 10 shows a system 1000 comprising outer tube 1001 and inner tube 1002 in which air passes down the inner tube 1003 and returns up the outer tube 1001. While it would be desirable that the outgoing air returns up into the air return duct 1005; a simple experiment shows that this is not so. Air from the central delivery duct 1004 forms a plume 1007 that continues on for a considerable distance before it disperses. Thus, air is sucked into the air return duct from the surrounding area 1006. This arrangement, without Coanda jet shaping is clearly unsuited to a sealed vacuum cleaner design.

Figure 11:
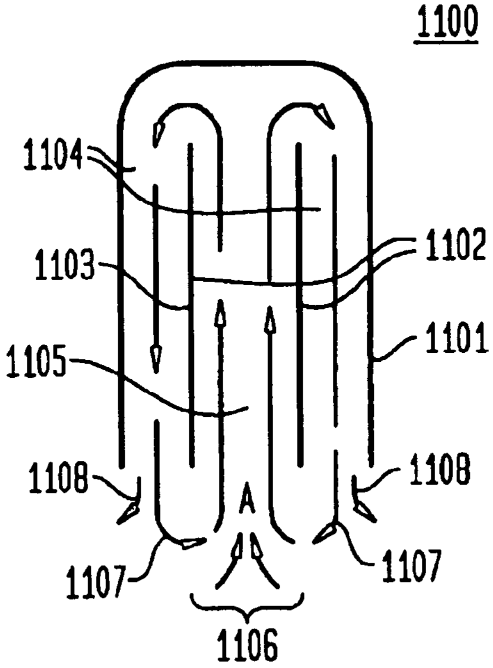
FIG. 11 (PRIOR ART)
FIG. 11 depicts a concentric vacuum system with air being sucked up the center and blown down the sides (PRIOR ART)

FIG. 11 shows a system 1100 having the reverse airflow of FIG. 10. Again, system 1100 comprises outer tube 1101 and inner tube walls 1102 (which form inner tube 1103). Air is blown down the outer air delivery duct 1104 and returned up the central return duct 1105. Air is initially blown out in a tube conforming to the shape of the outer air delivery duct 1104. As this air originates in the inner tube 1103, replacement air must be pulled from the space inside the tube of outgoing air. This leads to a low pressure zone at A, within and below the air return duct 1105. Consequently air is pulled in at A from the outgoing air. Thus the air (whose flow is exemplified by arrows 1107) is forced to turn around on itself and enter the return duct 1105. Such action is not perfect and a certain amount of air escapes 1108 at the sides of the air delivery duct, and is replaced by the same small amount of air 1106 being drawn into the air return duct 1105.

Figure 12:
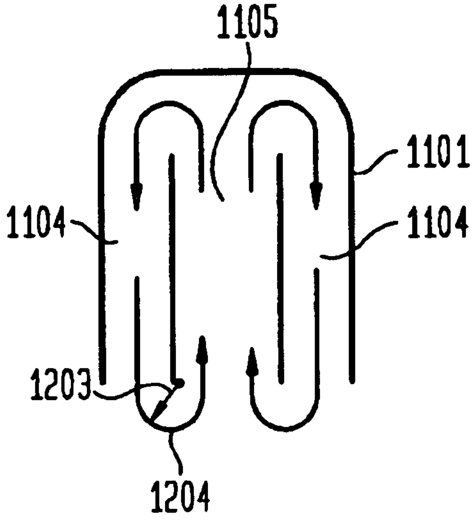
FIG. 12 (PRIOR ART)
FIG. 12 depicts the dynamics of the re-entrant airflow of the system of FIG. 11 (PRIOR ART)

Air interchange is reduced from the automatic lowering of the air pressure within the concentric system. FIG. 12 shows air returning from the delivery duct 1104 into the return duct 1105 with radius of curvature (R) 1203 and the velocity at 1204. With airspeed V at 1204, the pressure difference between the ambient outer air and the inside is $\varrho V^2/R$, where $\varrho$ is the air density. The airflow at the bottom of the concentric tubes is in fact half of a toroidal vortex, the other half being at the top of the inner tube within the outer casing 1101. The system of FIGS. 11 and 12 is thus a vortex system, with a low internal pressure and minimal mixing of outer and inner air.

Figure 13:
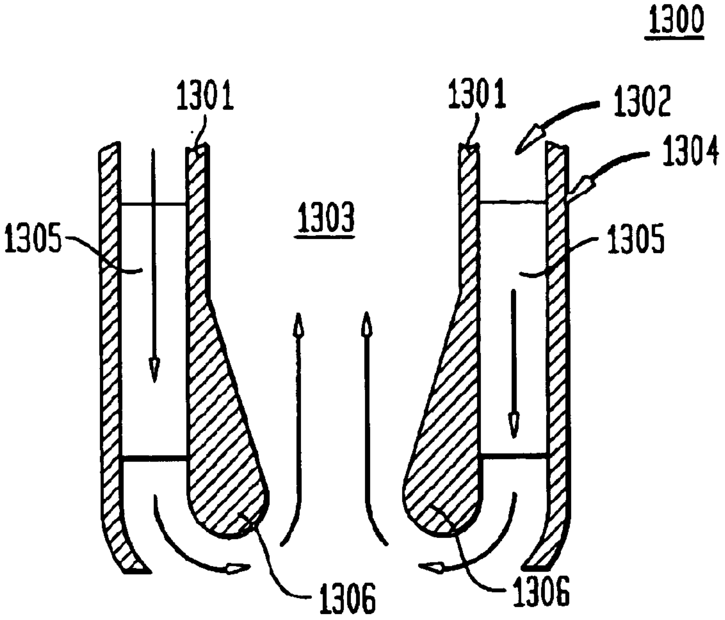
FIG. 13 depicts a cross section of an exemplary toroidal vortex vacuum cleaner nozzle in accordance with the present invention.

The simple concentric nozzle system shown in FIGS. 11 and 12 can be optimized into an effective toroidal vortex vacuum cleaner nozzle 1300 depicted in FIG. 13. The inner tube 1301 is thickened out and rounded off at the bottom (inner fairing 1306) for smooth airflow around from the air delivery duct 1302 to the air return duct 1303. The outer tube 1304 is extended a little way below the inner tube 1301 end and rounded inwards somewhat so that air from the delivery duct 1302 is not ejected directly downwards but tends towards the center. This minimizes the amount of air leaking sideways from the main flow. The nozzle has flow straightening vanes 1305 to eliminate any corkscrewing in the downward air motion in the air delivery duct 1302 that would throw air out sideways from the bottom of the outer tube 1304 due to centrifugal action. When compared to the coanda nozzles of the prior art, the vortex nozzle 1300 has less leakage and has a much wider opening for the high speed air flow to pick up dust.

Figure 14:
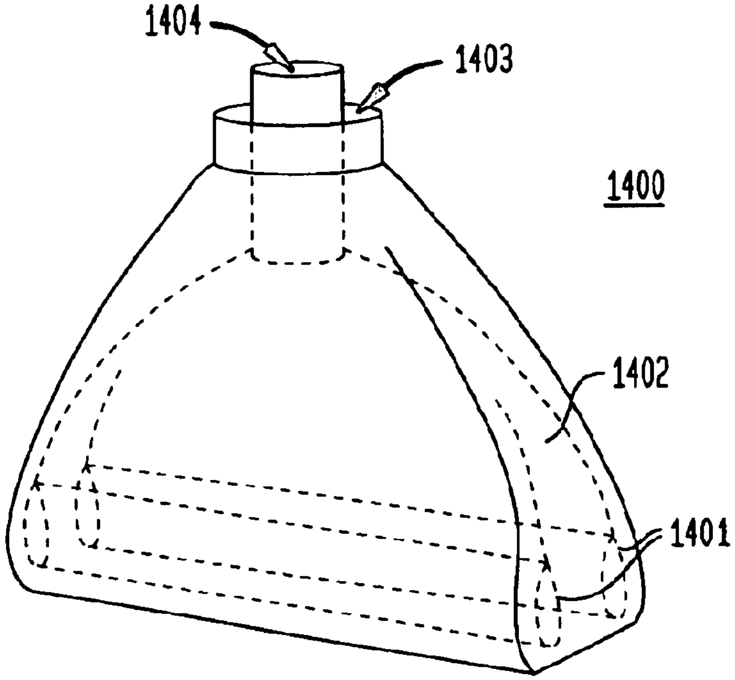
FIG. 14 depicts a perspective view of an exemplary rectangular toroidal vortex vacuum cleaner nozzle in accordance with the present invention.

The vortex nozzle has so far been depicted as circular in cross section, but this is not at all necessary. FIG. 14 shows a rectangular nozzle 1400 in which the ends are terminated by bringing the inner fairings 1401 to butt against the outer tube 1402. Air is delivered via the delivery duct 1403 and returns via the return duct 1404. Flow straightening vanes are omitted for clarity, but are, of course, essential. An alternate system, not shown, is to carry the nozzle cross section of FIG. 13 around the ends, as there will be some air leakage around the flat ends.

Figure 15:
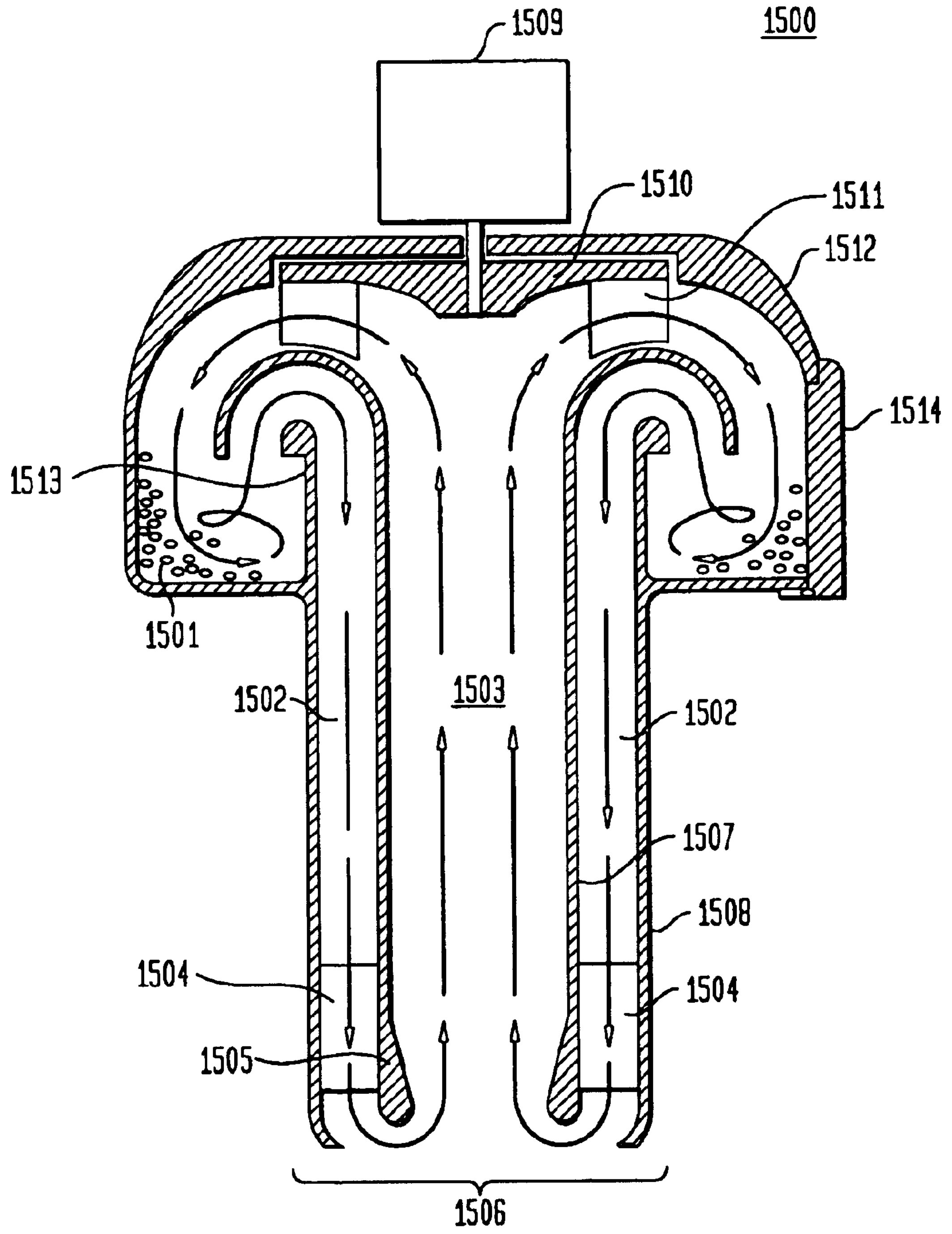
FIG. 15 depicts a cross section of an exemplary toroidal vortex bagless vacuum cleaner having an exemplary circular plan form.

FIG. 15 shows the addition of a centrifugal dirt separator, yielding a complete toroidal vortex vacuum cleaner 1500. Again, the ducting is created by an inner tube 1507 placed concentrically within outer tube 1508. Airflow through the outer air delivery duct 1502, the inner air return duct 1503 and the toroidal vortex nozzle 1506 (comprising flow straightening vanes 1504 and inner fairing 1505) are as described previously in FIGS. 12, 13 and 14. The air mover is a centrifugal air pump (as in the toroidal vortex attractor of FIG. 9) comprising motor 1509, backplate 1510 and blades 1511. Air leaving the centrifugal pump blades is spinning rapidly so that dust and dirt are thrown to the circular sidewall of the outer casing 1512. Air moves downward and inwards to follow the bottom of the dirt box 1501 SO that dirt is precipitated there as well. The air then turns upwards over a dirt barrier 1513 and down the air delivery duct 1502. At this point, the air is clean except for fine particulates that fail to be deposited in the dirt box 1501. These particulates circulate through the system repeatedly until they are finally deposited out. The system operates below atmospheric pressure so that air laden with fine dust is constrained within the system and cannot escape into the surrounding atmosphere. After use, the dirt that has been collected in the dirt box 1501 can be emptied via the dirt removal door 1514.

FIG. 15 depicts a circular nozzle 1506, but the system works equally well with the rectangular nozzle of FIG. 14. Various nozzle shapes can be designed and will operate satisfactorily, providing that the basic cross section of FIG. 13 is used.

Figure 16:
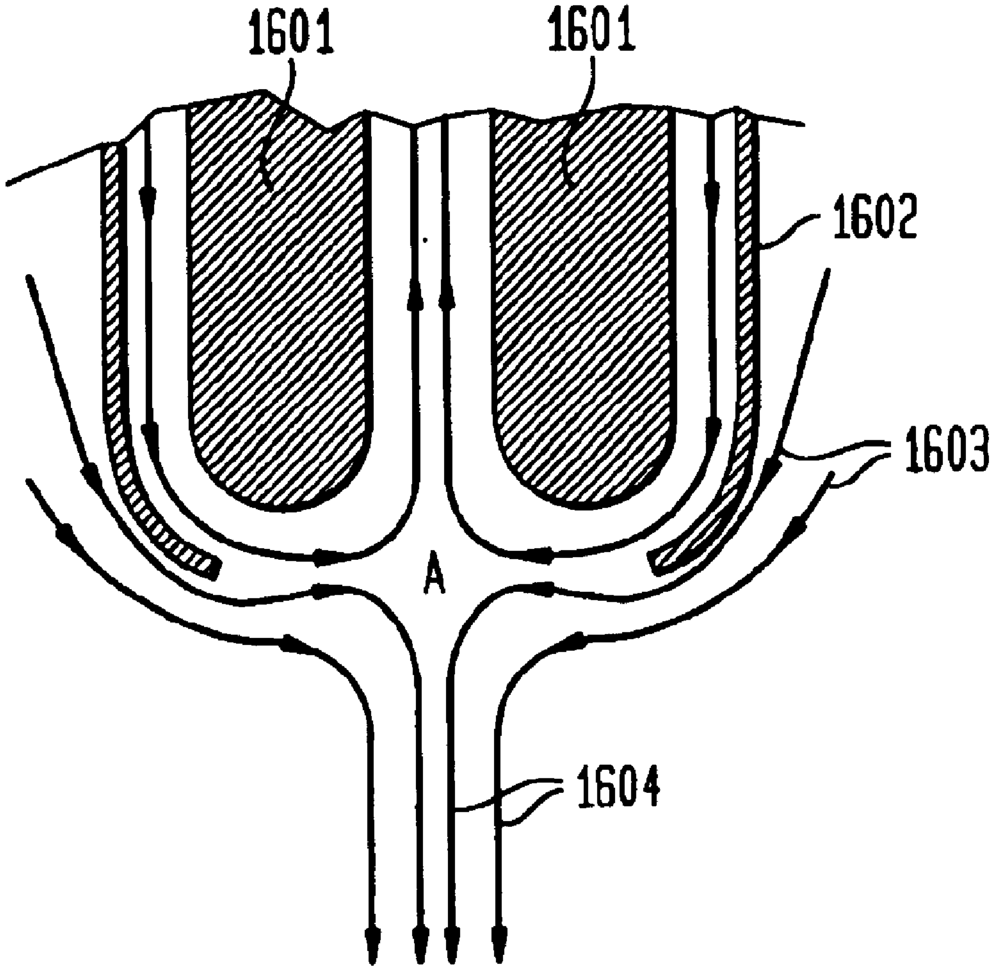
FIG. 16 depicts a cross section in which the toroidal vortex nozzle creates a downward air plume.

There are instances wherein the pressure in the outer tube 1601 leading to the nozzle may be slightly greater than ambient. This can cause some air to stray from the toroidal vortex flow in the nozzle. As in FIG. 16, the strayed air streams can flow into each other from opposing directions. This results in a high pressure region A. The high pressure zone of air will tend to flow downward in an air plume 1604. The downward flowing air plume 1604 is highly undesirable. First of all, the air plume prevents dust and other matter from being sucked into the inner tube 1602 since the region A is no longer lower than atmospheric pressure. As shown, outer air 1603 is drawn by downward airflow such that it flows downward along with the plume 1604. The indicated airflow demonstrates that the nozzle is impaired from its ability to suck in objects under these conditions. Furthermore, the downward flow of plume 1604 may blow dust away, even at a distance from the nozzle, scattering the dust into the atmosphere.

Figure 17A:
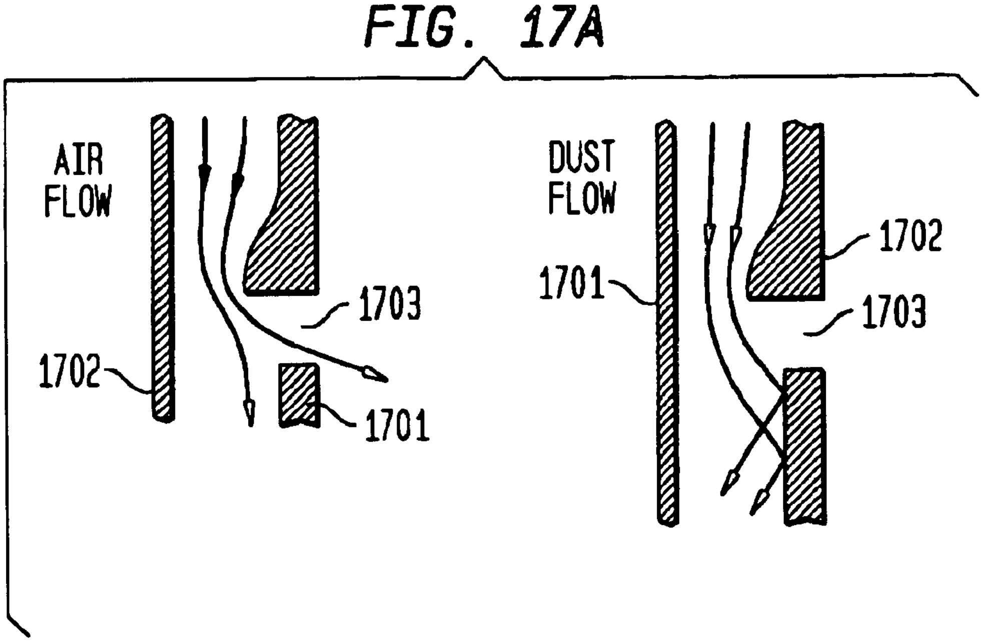
FIGS. 17A and 17B depict venting techniques that prevent excessive pressure in the annular duct.
Figure 17B:
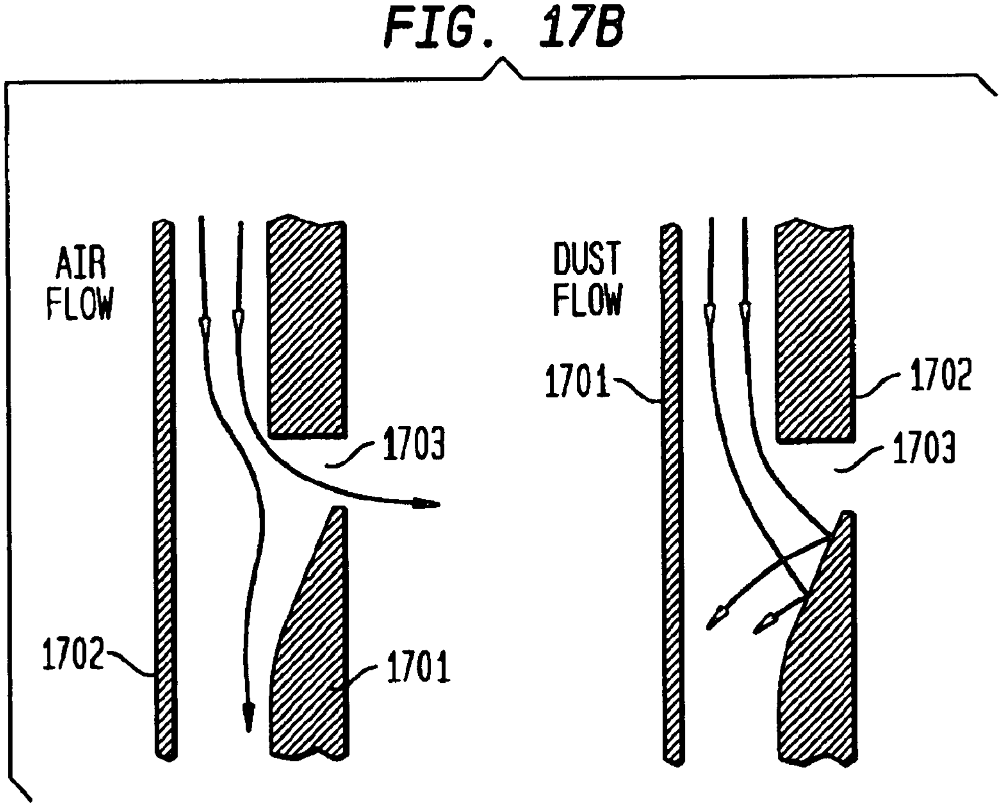

To remedy the problems associated with plumes in the present invention, the outer tube 1602 may be vented in order to lower pressure between inner tube 1701 and outer tube 1702. Two possible configurations of vents are depicted in FIGS. 17A and 17B. FIG. 17A shows an embodiment wherein the inner wall of the outer tube 1702 is thickened before the vent opening 1703. Airflow is capable of bending around the thickened outer tube 1702 and exiting into the atmosphere. The higher mass dust particles, which may remain in the airflow due to imperfect separation, are incapable of bending with the airflow quickly enough to exit the system. Thus, air may be allowed to exit the system, thereby lowering pressure, while still containing dust within the system.

The second possible embodiment, depicted in FIG. 17B, utilizes a tapered outer tube 1702 after the vent 1703. Once again, airflow is capable of bending and exiting into the atmosphere. However, the higher mass dust particles are incapable of bending quickly enough to escape. Consequently, the dust flow collides with the tapered wall and continues through the inner tube 1701. This embodiment, as well as that depicted in FIG. 17A, reduces pressure while preventing dust from being released into the atmosphere.

Although these are two possible configurations of vents to reduce the pressure, other vent designs are possible to accomplish the same objective. Furthermore, other means to reduce pressure in the outer tube may be made without departing from the principles of the inventions.

Importantly, these vents permit small amounts of airflow to escape, therefore minimally compromising the efficiency of the vacuum cleaner system. Furthermore, the usage of these vents is not at all necessary in all situations. However, venting adapts the vacuum cleaner system to perform optimally in situations involving very fine dust particles. Additionally, the vents may be designed such that the size of the vent may be controlled. This allows the vacuum to be instantly modified for different situations in which different type of matter is to be vacuumed. Further, a protective screen which does not interrupt the toroidal vortex fluid flow may be implemented to prevent large objects from being sucked into the nozzle. The protective screen and/or the nozzle may be adapted to easily snap on and off or may be permanently attached to the nozzle. Thus, the nozzle may be quickly adapted to situations that require vacuuming only small particles.

Figure 18:
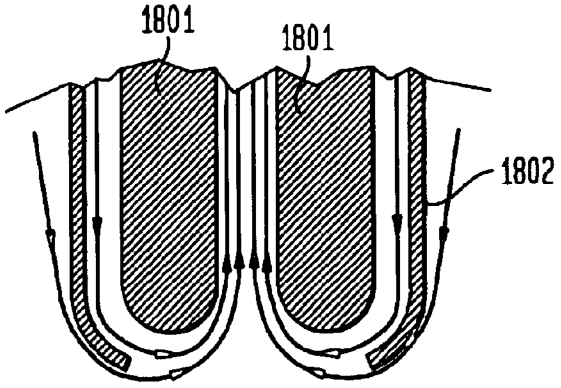
FIG. 18 depicts a cross section of a toroidal vortex nozzle functioning with venting.

FIG. 18 illustrates the fluid flow resulting from such venting of outer tube 1802 and inner donut 1801 in the present invention. Some air from the atmosphere is sucked into the nozzle replacing the air escaping through the vents. Nevertheless, all previously mentioned, desirable characteristics of the toroidal vortex nozzle are preserved.

Figure 19A:
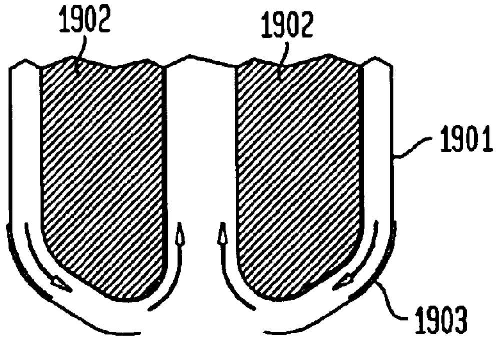
FIGS. 19A and 19B depict an alternative embodiment of the vortex nozzle that prevents pluming and maintains a toroidal vortex against surfaces.
Figure 19B:
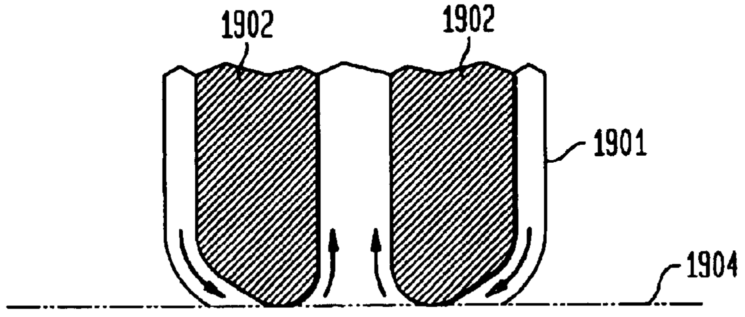

Another preventative measure against pluming is to extend the outer tube 1901 inward with an additional sleeve 1903 as shown in FIG. 19B. The additional barrier created by the additional sleeve 1903 helps guide air around inner donut 1902 into a toroidal vortex. Further, the nozzle can be placed against a surface 1904 without impeding the toroidal vortex flow. FIG. 19A depicts airflow when the nozzle is placed against a surface without the additional sleeve. As shown, airflow is blocked. Thus the efficiency of the toroidal vortex nozzle is not lost.

Figure 20A:
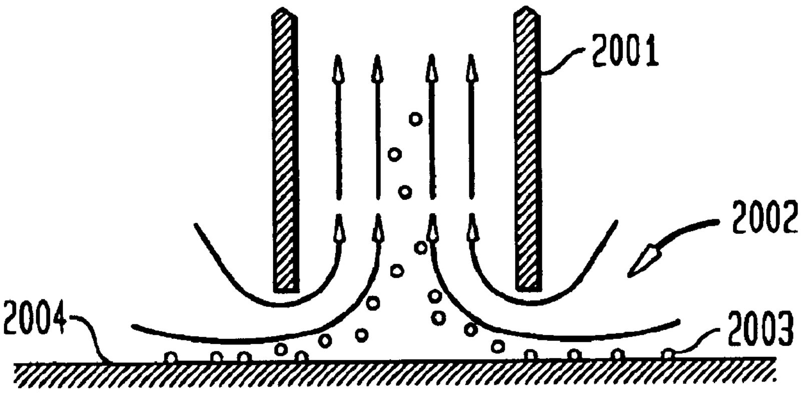
FIG. 20A (PRIOR ART)
FIGS. 20*a* and 20*b* depict conventional vacuum cleaner nozzles (PRIOR ART)
Figure 20B:
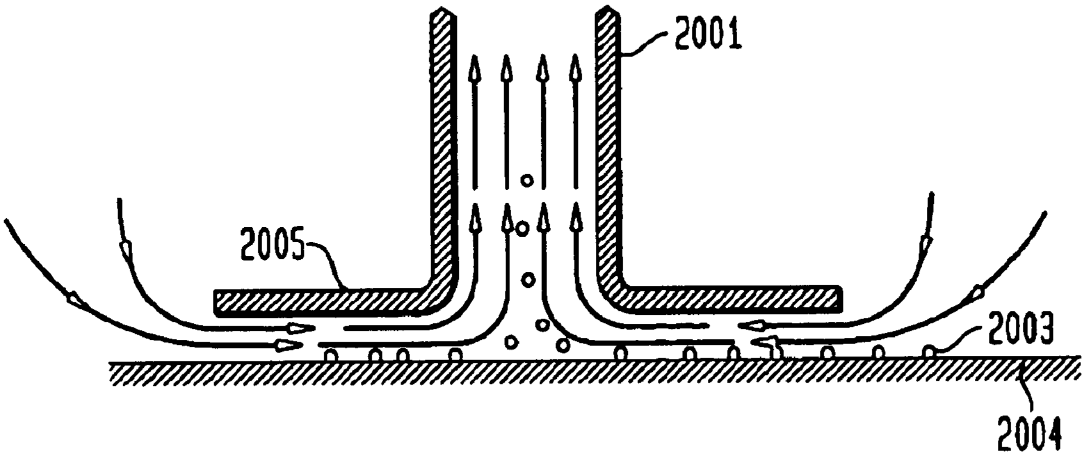
FIG. 20B (PRIOR ART)

FIGS. 20*a* and 20*b* show how conventional nozzles behave in close proximity to a floor 2004 or other surfaces. Air is drawn from the atmosphere and sucked into the nozzle 2001 carrying dust 2003 along with it. Flanges 2005 with wheels may be included (not shown for clarity) as in FIG. 20*b* to fix the nozzle's 2001 height. Since the effectiveness of a conventional vacuum cleaner is determined by measuring the amount of air that can be moved, placing the nozzle too close to the floor 2004 compromises effectiveness by restricting airflow.

Figure 21A:
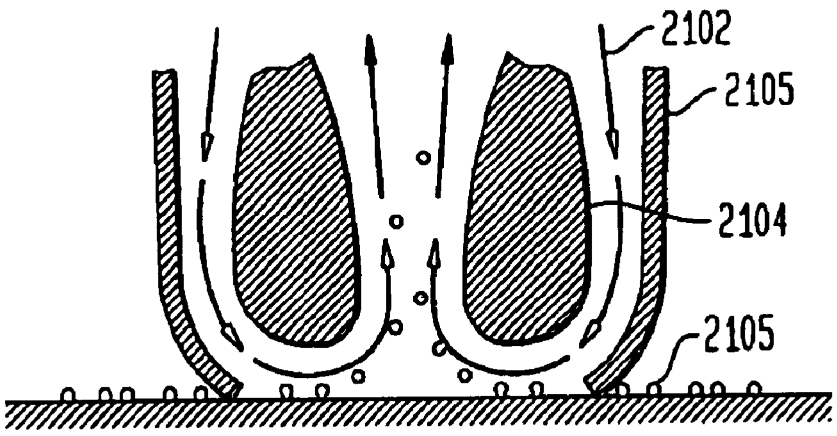
FIGS. 21*a* and 21*b* depict a toroidal vortex nozzle against a surface and a pile carpet.

The toroidal vortex nozzle can avoid this problem in the present invention. The airflow 2102 in through the nozzle is as shown in FIG. 21A. Airflow 2102 is not restricted from flowing around inner donut 2103 even though the nozzle's outer tube 2104 is pressed against the surface 2105. Further, the air does not need to be accelerated from a stationary state and kinetic energy does not escape the system. Moreover, air is not expelled into the atmosphere preventing the escape of unseparated dust. This also makes the use of inefficient filters unnecessary.

Figure 21B:
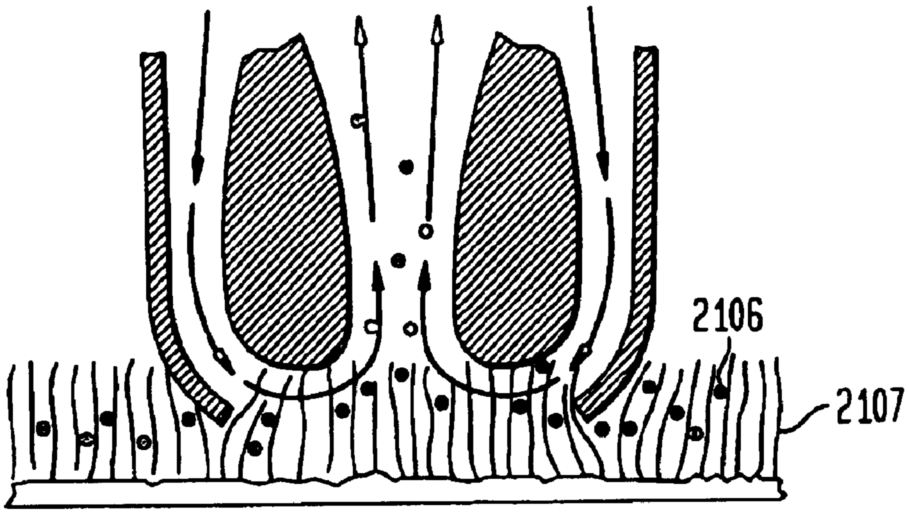

FIG. 21*b* shows the nozzle being used on a pile carpet 2107. The resultant airflow is virtually the same as described in FIG. 21A. Here, pile 2107 is sucked into the nozzle such that the airflow can pass through it. Dirt particles 2106 are then removed from the pile 2107. This leads to more effective cleaning of the carpet 2107. The toroidal vortex nozzle may make the use of a brush or other means to loosen dirt particles 2106 unnecessary.

Additional adjustments may be made to specialize the nozzle for specific situations. For example, the nozzle may be angled to reach difficult places. The nozzle may have brush bristles to sweep dust and dirt. A sealable ring may be placed on the end of the outer tube to allow the nozzle to seal to a surface. Fingerlike projections may also extend from the outer tube to distance it from the surface. However, air, dust, and dirt may still pass in between those fingers. The end of the nozzle may comprise felt, or another soft material, to prevent damage to delicate objects or surfaces. Also, wheels may be fitted to the nozzle to allow it to roll along a surface. Although these are possible adaptations of the toroidal vortex nozzle, the nozzle is not limited to these adaptations. Various other embodiments may be utilized without departing from the spirit or teachings of the present invention.

The present invention can utilize an improved centrifugal dust separator. As in FIGS. 22A and 22B, improvement is made by the addition of a dust collector 2205. The new toroidal vortex vacuum cleaner is also a bagless design with additional features to provide more thorough separation of air and dust by separating the main airflow from the dust collection.

Figure 22A:
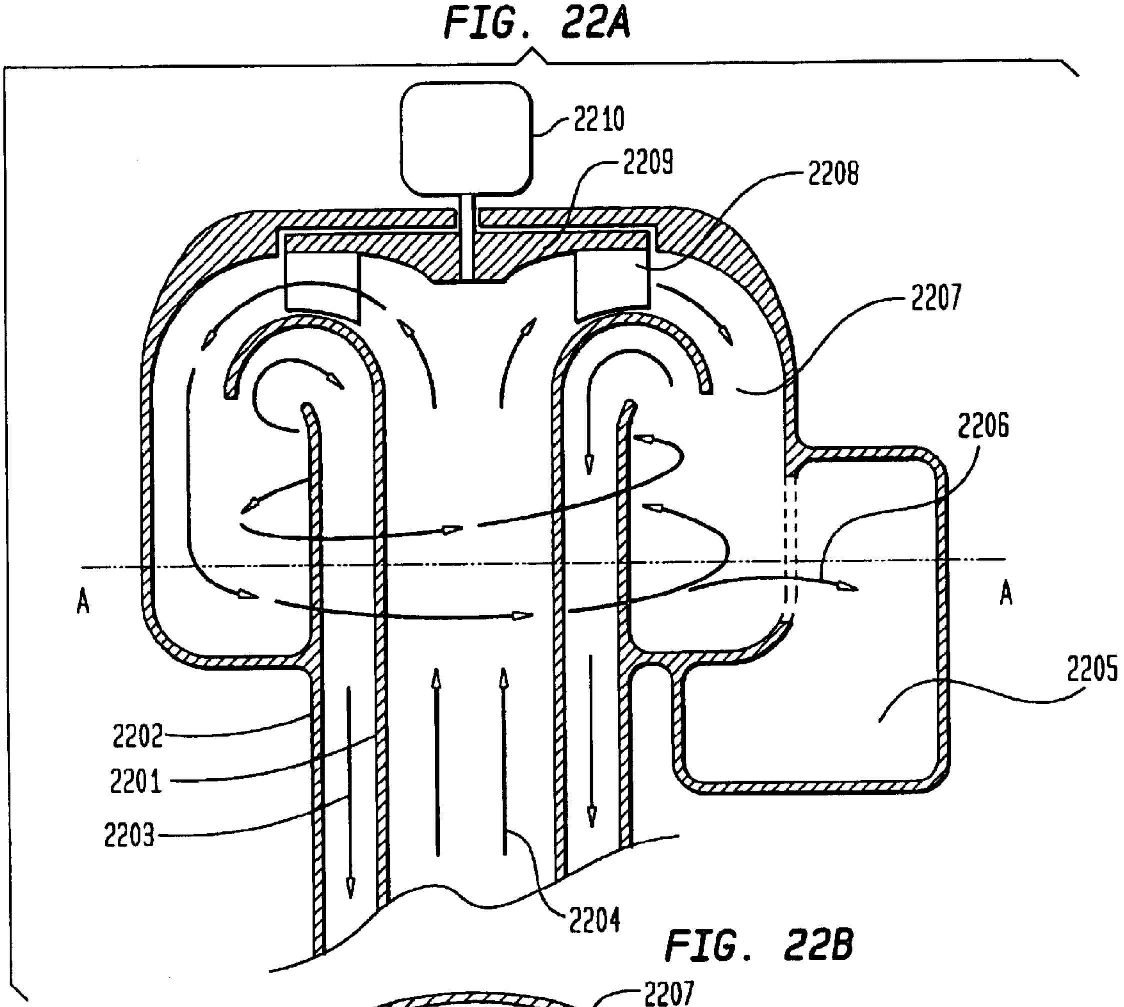
FIGS. 22A and 22B depicts an improved centrifugal dust separator in accordance with the present invention.
Figure 22B:
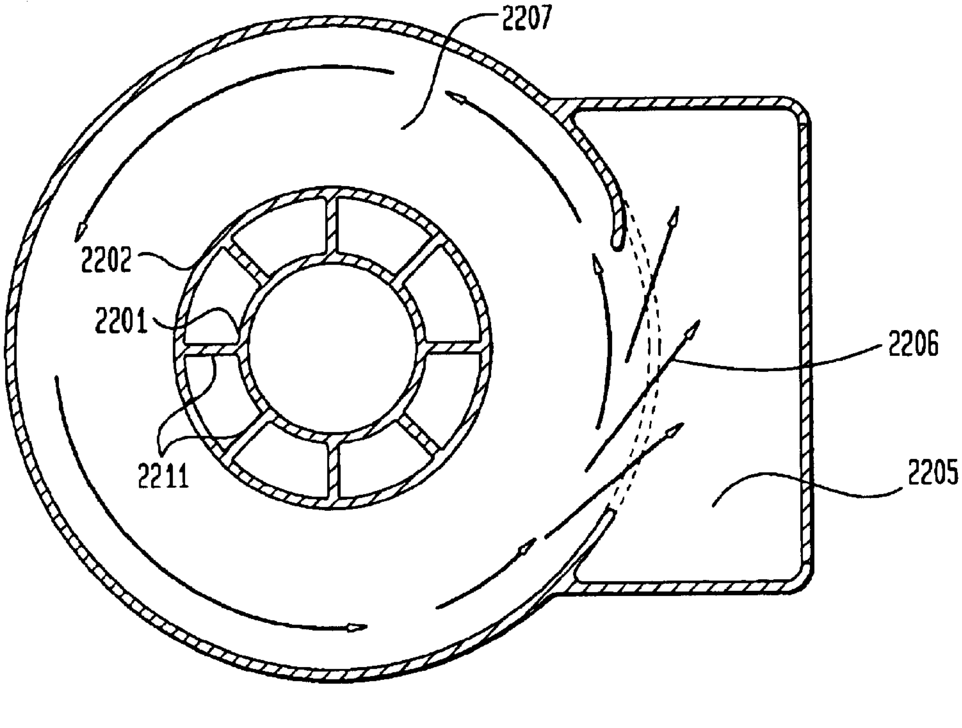

Side and top view of the improved centrifugal dust separator are shown in FIGS. 22A and 22B, respectively. At the bottom are two concentric tubes, the inner tube 2201 and the outer tube 2202, through which fluid may pass. The annular duct created between inner tube 2201 and outer tube 2202 contains straightening vanes 2211. Straightening vanes 2211 extend radially outward from the outer wall of inner tube 2201 to the inner wall of outer tube 2202. Straightening vanes 2211 also extend from the top of the exit duct created by the inner tube 2201 and outer tube 2202 downward. The top of the inner tube 2201 curves outward such that its vertical cross section, as shown in FIG. 22A, forms semicircles arranged with the open side of the circle facing downward. Centered directly above the inner tube 2201 is the impeller 2209. At the outside of the impeller are the impeller blades 2208, which are fitted to conform to the curvature in the inner tube 2201. The motor 2210 which provides power to the impeller 2209 is located above the impeller 2209. Housing is provided containing the impeller blades, separation chamber, dust collector. The dust housing connects to the concentric tubing providing in and out flow.

The horizontal cross-section of FIG. 22B illustrates the circular shape of the housing. The cylindrical walls of the housing maintain the vortex airflow. Attached to the cylindrical housing is the dust collector 2205. The dust collector 2205 is a sealed container in which debris ejected from the vortex accumulate. The housing has an opening in its outer wall through which dust may pass. As shown in the horizontal cross, the edge of the opening facing into the direction of airflow bends slightly inwards to facilitate dust collection. The dust collector 2205 is attached to the outer and lower walls of the housing as shown in FIG. 22. The walls of the outer tube 2202 bend slightly outward to facilitate smooth airflow from the chamber 2207 to the annular exit duct between inner tube 2201 and outer tube 2202. Nevertheless, other arrangements to facilitate airflow may just as well be used. The inner tube 2201 and outer tube 2202 may extend downward and terminate with a toroidal vortex nozzle as depicted in FIG. 13. Although this is the preferred embodiment, the centrifugal dust separator is capable of functioning without such a nozzle. Any other concentric nozzle design may be used. In addition, any system that supplies an input flow to inner tube 2201 and receives an output flow from annular duct formed between inner tube 2201 and outer tube 2202 is capable of utilizing the separator.

The flow geometry of the improved centrifugal separator is depicted in FIGS. 22A and 22B. Dust-laden air is sucked up through the inner tube 2201 under the power of the impeller 2209. The impeller blades 2208 then move the air in a circular pattern. Circularly rotating air is then directed outwards where it spirals downward along the outer wall of the chamber 2207 creating a cylindrical vortex flow pattern. The kinetic energy of the circulating air creates a higher pressure at the outer boundaries of separation chamber 2207 than that of the air within the body of the chamber 2207. This higher pressure is maintained in the dust collector 2205. Depending on the system geometry, this may be higher or lower than the outside ambient. This high pressure forces air inward maintaining air's circular path. However, the circulating dust is not inhibited from carrying straight into the dust collector as shown in FIGS. 22A and 22B. When the spiraling air reaches the bottom of the outer wall of the chamber 2207, the air then spirals upward along the inner wall of the chamber 2207. Remaining dust particles may still travel outward from the inner spiral of air. The result is substantially clean air exiting the chamber 2205 at the top of its inner wall. The exiting, cleaned air is then sent into the annular duct created between the inner tube 2201 and the outer tube 2202, in which it flows downward. With the addition of straightening vanes 2211, straight flowing air is supplied, preferably, to a toroidal vortex nozzle. Yet, alternative embodiments are possible not involving a toroidal vortex nozzle or any nozzle.

This embodiment has air mixed with dirt and dust passing through the impeller 2209. A course mesh trap may be inserted upstream of the impeller 2209 to prevent large objects from colliding with the impeller 2209. In alternate arrangements the impeller 2209 the impeller is replaced with axial air pump or propeller. Such devices may be mounted in the inner tube 2201. The inner tube 2201 may be swelled out for this purpose. Also, the addition of a separate centrifugal separator is contemplated that may be inserted into the air return path and may be driven by the same motor shaft as the impeller.

Further, the improved centrifugal separator is capable of functioning in various fluid media, such as water and various other liquids and gases. Moreover, the present invention is capable of separating larger objects from fluid, such as nails, pebbles, sand, screws, etc., in addition to fine particles and dust.

In order to remove material collected in the dust collector 2205, the dust collector 2205 may be constructed to be removable. Alternatively, the dust collector 2205 may be fitted with a door or a removable plug through which the contents may be removed. Various other improvements may be made in order to remove material from the dust collector 2205 so long as the pressure differential between the dust collector 2205 is maintained.

Figure 23A:
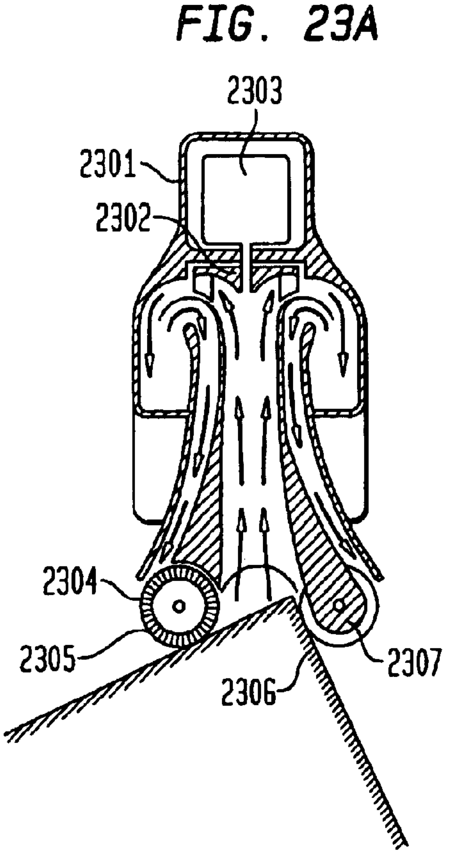
FIG. 23 depicts a vortex pool cleaner in accordance with the present invention.
Figure 23B:
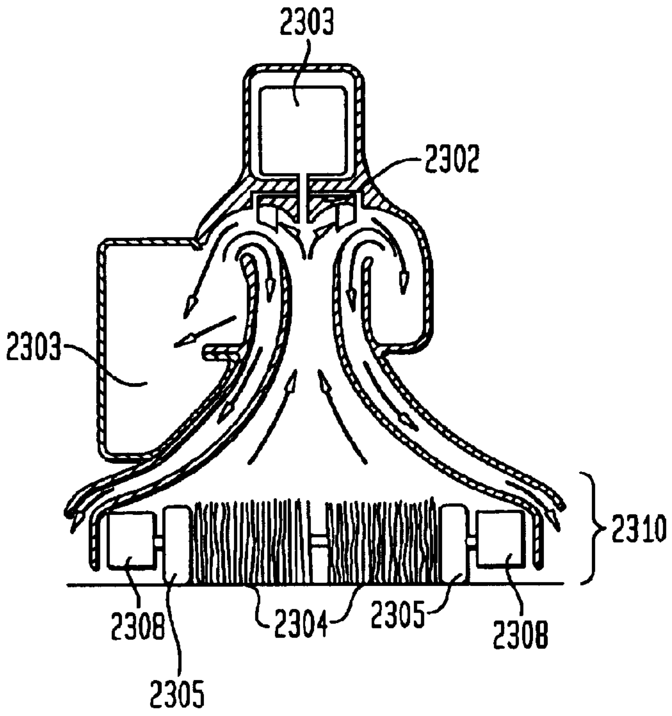

The previously disclosed vortex technology can be adapted to function as a pool cleaner. FIG. 23A depicts the present invention from the side; and FIG. 23B depicts the present invention from the front. As shown, the impeller 2302 and dirt box 2303 (previously referred to as the dust collector) of the centrifugal separator of the present invention is of the same geometry as the vacuum cleaner embodiments. The major difference lies in the nozzle configuration. The preferred embodiment utilizes a rectangularly shaped toroidal vortex nozzle 2310. Wheels 2305 and 2306 are provided on the nozzle allowing the device to traverse the walls and floor of the pool. Further, fluid flows around the axle of wheels 2305 and 2306 to form a toroidal vortex. The rear wheels 2306 are attached to the inner donut fairing 2307 of the vortex nozzle. Brushes 2304 are provided on the axle of the front wheels 2305 to loosen dirt from the pool's surface. The brushes 2304 also serve to guide fluid into a toroidal vortex. Coupled to the same axle are the traction motors 2308. The traction motors 2308 provide torque to the axle so the device traverses the floor and walls of the pool. The traction motors 2308 may operate at different speeds so that the pool cleaner can turn itself in any direction.

Finally, the housing of the pool cleaner is made to be watertight so that water cannot leak in or escape out. The watertight housing further prevents water from damaging the motor 2303 or accidents due to water contacting the motor 2303.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

I claim:

1. A fluid cleaner utilizing a fluid flow comprising:

fluid delivery means for providing a fluid flow; and a toroidal vortex nozzle, said nozzle comprising an inner tube and an outer tube, said nozzle being coupled to said fluid delivery means;

wherein said fluid flow through said nozzle has substantially the characteristics of a toroidal vortex wherein said toroidal vortex creates a low pressure region to attract matter, and further wherein said torodial vortex is a substantially recirculating unit volume of fluid.

2. A fluid cleaner in accordance with claim 1 further comprising wheels.

3. A fluid cleaner in accordance with claim 1 further comprising a brush.

4. A fluid cleaner in accordance with claim 1 further comprising a rotating brush.

5. A fluid cleaner in accordance with claim 1 wherein the distal end of said toroidal vortex nozzle is rectangular.

6. A fluid cleaner in accordance with claim 1 wherein the region between said inner tube and said outer tube is vented.

7. A fluid cleaner in accordance with claim 1 further comprising a watertight housing.

8. A fluid cleaner in accordance with claim 1 wherein said fluid cleaner is capable of traversing a surface.

9. A fluid cleaner in accordance with claim 1 further comprising a traction motor.

10. A fluid cleaner in accordance with claim 1 wherein said fluid flow is generated by an impeller.

11. A fluid cleaner in accordance with claim 1 wherein said fluid flow is generated by a centrifugal pump.

12. A fluid cleaner in accordance with claim 1 wherein said fluid flow is generated by a propeller.

13. A fluid cleaner in accordance with claim 1 further comprising a collector.

14. A fluid cleaner in accordance with claim 1 further comprising a collector and a centrifugal separation chamber, wherein the pressure in said collector is greater than in said centrifugal separation chamber.

15. A fluid cleaner in accordance with claim 1 further comprising centrifugal separation means.

16. A fluid cleaner in accordance with claim 1 further comprising:

centrifugal separation means; and a removable collector.

17. A fluid cleaner in accordance with claim 1 further comprising:

centrifugal separation means; and a collector.

18. A fluid cleaner in accordance with claim 1 further comprising:

centrifugal separation means;

a collector; and a removable plug in said collector.

19. A fluid cleaner in accordance with claim 1 further comprising:

centrifugal separation means;

a collector; and a door in said collector.

20. A fluid cleaner in accordance with claim 1 further comprising:

centrifugal separation means; and a collector;

wherein the pressure in said collector is greater than in said centrifugal separation means such that a cylindrical fluid flow inside said centrifugal separation means is maintained without preventing matter from traveling into said collector.

21. A fluid cleaner in accordance with claim 1 wherein said fluid cleaner operates in a pool.

22. A fluid cleaner in accordance with claim 1 wherein said fluid cleaner traverses a surface submerged in a fluid.

23. A method of cleaning surfaces submerged in a fluid comprising the steps of:

attracting matter with a toroidal vortex;

centrifugally separating said matter from said fluid; and recirculating said fluid; wherein said method a substantially unit volume of fluid is recirculated.

24. A method according to claim 23 wherein attracting said matter occurs in a toroidal vortex nozzle.

25. A method according to claim 23 further comprising the step of loosening said matter from said surface.

26. A method according to claim 23 further comprising the step of loosening said matter from said surface with a brush.

27. A method according to claim 23 further comprising the step of loosening said matter from said surface with a rotating brush.

28. A method according to claim 23 wherein said attracting is performed by a toroidal vortex fluid flow.

29. A method of separating matter from a fluid comprising the steps of:

centrifugally separating said matter from said fluid; and recirculating said fluid through a toroidal vortex nozzle, wherein a shubstantially unit volume of fluid is recirculated.

30. A method in accordance with claim 29 further comprising the step of brushing a surface to loosen matter from said surface.

31. A method in accordance with claim 29 further comprising the step of:

brushing a surface to loosen matter from said surface; and attracting said matter with said toroidal vortex nozzle.

32. A method in accordance with claim 29 wherein said fluid is pool water and said matter is in said pool water and on the submerged surfaces of a pool.

33. A fluid cleaner utilizing a fluid flow comprising:

an impeller for providing said fluid flow;

a motor for powering said impeller; and a torodal vortex nozzle, said nozzle comprising an inner tube and an outer tube, said torodial vortex nozzle coupled to said impeller;

a centrifugal separation chamber also coupled to said impeller;

a collector coupled to said centrifugal separation chamber for storing matter separated from said fluid;

wheels;

wherein said nozzle further comprises flow straightening vanes disposed therein, and further wherein said nozzle is vented.

* * * * *